US006653432B2

(12) United States Patent
Dallemer et al.

(10) Patent No.: US 6,653,432 B2
(45) Date of Patent: Nov. 25, 2003

(54) CONDENSATION POLYMERIZATION METHOD FOR ISOCYANATES

(75) Inventors: Frédéric Dallemer, Lyons (FR); Jean-Marie Bernard, Mornant (FR); Denis Revelant, Genas (FR); Frédéric Leising, Avilly Saint-Leonard (FR)

(73) Assignee: Rhodia Chimie, Cedex (FR)

( * ) Notice: Subject to any disclaimer, the term of this patent is extended or adjusted under 35 U.S.C. 154(b) by 0 days.

(21) Appl. No.: 10/168,020

(22) PCT Filed: Dec. 29, 2000

(86) PCT No.: PCT/FR00/03757

§ 371 (c)(1),
(2), (4) Date: Jun. 18, 2002

(87) PCT Pub. No.: WO01/49766

PCT Pub. Date: Jul. 12, 2001

(65) Prior Publication Data

US 2003/0130467 A1 Jul. 10, 2003

(30) Foreign Application Priority Data

Dec. 29, 1999 (FR) .............................................. 99 16687

(51) Int. Cl.$^7$ ................................................. C08G 18/22
(52) U.S. Cl. ........................ 528/55; 544/193; 544/222; 252/182.2; 252/182.21
(58) Field of Search ............................ 528/55; 544/222, 544/193; 252/182.2, 182.21

(56) References Cited

U.S. PATENT DOCUMENTS 3,736,298 A 5/1973 Schmit et al.

FOREIGN PATENT DOCUMENTS

FR 2 770 533 5/1999
GB 1 386 399 3/1975

OTHER PUBLICATIONS

Q. Shen et al., *Organometallics*, vol. 16, pp. 3711–3714, XP002102537; 1997.
S. Inoue et al., *Macromolecular Rapid Communications*, vol. 17, 1996, pp. 1–7, XP002147381.

*Primary Examiner*—Rachel Gorr
(74) *Attorney, Agent, or Firm*—Burns, Doane, Swecker & Mathis, L.L.P.

(57) ABSTRACT

The invention concerns a (cyclo)trimerisation method for isocyanates having at least two isocyanate functions, characterised in that it comprises: a) reacting initial isocyanate monomers having at least two isocyanate functions, optionally in the presence of other monomers reactive with the isocyanate monomers having at least two isocyanate functions at a temperature of at least 20° C., advantageously at least 50° C., and lower than 200° C., advantageously lower than 150° C., in the presence of a compound comprising at least one rare earth alcoholate function; b) stopping the reaction by inactivating the catalyst or its derivative forms in the reaction medium at a transformation rate of at least 2.5% and at most 90% of the initial isocyanate functions; and optionally c) distilling the reaction medium to eliminate the unreacted monomers.

19 Claims, No Drawings

CONDENSATION POLYMERIZATION METHOD FOR ISOCYANATES

The invention concerns a novel catalyst for the polycondensation of diisocyanates, in particular the (cyclo) trimerisation of diisocyanates.

A large number of catalysts are used for the polycondensation of diisocyanates to produce as a majority trimeric compounds with an isocyanurate and/or biuret and/or allophanate unit.

Mention may be made of catalysts of basic type such as tertiary amines described in DE 951 168, derivatives of alkali or alkaline earth metals such as hydroxide, carbamate, alcoholate, etc, described in FR 1 190 065, quaternary ammonium hydroxides described in FR 1 204 697, FR 1 566 256, EP 3765 and EP 10589, catalysts with an ethyleneimine group described in FR 1 401 513 and FR 2 230 642, the Mannich bases in general obtained from phenol, aldehyde and secondary amine described in FR 2 290 459 and FR 2 332 274, phosphines described in FR 1 510 342, FR 2 023 423 and DE 19 347 63 and the aminosylilated derivatives such as monoaminosilanes, diaminosilanes, silylureas and silazanes described in EP 57653.

Those catalysts generally make it possible to obtain a polycondensation product having a satisfactory proportion of trimers.

U.S. Pat. No. 3,736,298 describes a process for the trimerisation of polyisocyanates using a double alcoholate of metals selected from the transition metals of groups III-A, IV-A and V-A, alkali metals and alkaline earth metals, more particularly a complex of alkali or alkaline earth metal of a polyvalent metal alcoholate.

The catalyst is added at ambient temperature (10–40° C.) to the reaction medium containing the isocyanate compounds and causes brutal autogenous exothermy which is not controllable. The temperature can thus reach and even exceed 200° C. The product obtained at the end of the reaction is a polyisocyanurate compound which is not clearly defined. Moreover, having regard to the exothermy factor and the autocatalytic character of the reaction, it is difficult to develop such a method on an industrial scale. Control of the method is an essential parameter insofar as it makes it possible to reproducibly guarantee a well-defined composition and targeted properties such as products of controlled viscosity, in particular products of very low viscosity.

GB 1 386 399 describes a method for the preparation of isocyanurate polymers by the reaction of isophorone diisocyanate and a catalytic amount of alkali metal phenolate.

Moreover H. Sugimoto and S. Inoué describe in Macromol. Rapid Commun., 17, No 1, January 1996, pages 1–7, the use of lanthanum isopropylate and other lanthanide isopropylates as an anionic initiator for the polymerisation of hexylisocyanate to obtain poly(hexyl isocyanate) of very high molecular weight. The reaction is conducted at low temperatures (−78° C.). The document also mentions that at ambient temperature the cyclic trimer is the only reaction product.

In addition it is indicated that the polymerisation of isocyanates carrying secondary and tertiary alkyl groups does not take place.

Ikeda et al (Pure Applied Chem. A 3410), pages 1907–1920 (1997) also describe the polymerisation of monoisocyanates at ambient temperature by means of alcoholates of lanthanides.

They report that, when n-hexyl isocyanate is reacted with yttrium isopropylate at ambient temperature, the result obtained is a product of high viscosity which solidifies after 10 minutes.

After one hour, when hydrochloric acid in methanol solution is added to the polymerisation mixture at ambient temperature, a white powder precipitates.

By the addition of a hydrochloric solution of that white powder in methanol, the result obtained is a fibrous polymer of a molecular weight of 59,000, which is revealed by infrared analysis to have the structure of nylon-1.

On the other hand, with lanthanum triisopropylate, n-hexylisocyanate results at ambient temperature in cyclic trimer as the sole reaction product.

It has now surprisingly been found that in the presence of alcoholates of rare earths, isocyanates having at least two isocyanate functions reproducibly result, under certain condition in terms of control of the reaction, in a (cyclo) condensation product composed principally of true trimer, namely the product of cyclotrimerisation of the isocyanate comprising a single isocyanurate ring, for a high rate of transformation of the initial isocyanate monomer.

Depending on the rare earth used, it is possible to obtain besides the isocyanurate forms, derivatives of biuret and/or imino-oxadiazinetrione type.

The invention concerns a method for the (cyclo) trimerisation of isocyanates having at least two isocyanate functions, characterised in that it comprises:

a) reacting initial isocyanate monomers having at least two isocyanate functions, optionally in the presence of other monomers reactive with the isocyanate monomers having at least two isocyanate functions, at a temperature of at least 20° C., advantageously at least 50° C., and lower than 200° C., advantageously lower than 150° C., in the presence of a compound comprising at least one ligand including an alcoholate function of rare earths, b) stopping the reaction by inactivating the catalyst, in particular by the addition of a compound selected from a strong acid and a peroxide and mixtures thereof at a rate of transformation of the NCO functions present in the reaction medium of at least 2.5%, advantageously 5%, preferably 6%, and at most 80%, advantageously 70%; and optionally c) distilling the reaction medium to eliminate the unreacted monomers.

Advantageously the compound comprising at least one ligand including a rare earth alcoholate function is in accordance with the invention an alcoholate of rare earths. The other ligands may comprise other functions such as for example acetylacetonates.

For a definition of elements of rare earths, reference will be made to the Table on page B.208 of the "Handbook of Chemistry and Physics", Editor Robert C. Weast, 67th Ed.

They comprise the following elements: scandium, yttrium, lanthanum as well as lanthanides (cerium, praseodymium, neodymium, samarium, europium, gadolinium, terbium, ytterbium and lutetium).

According to the invention it is possible to add a compound comprising a rare earth alcoholate function or a mixture of compounds.

The rare earth alcoholate function may consist of any function obtained by substitution of an alcohol OH group by a rare earth metal.

Mention may be made in particular of propylates, especially isopropylates, in particular isopropylate of the following rare earth elements: Y, Sm, Yb and La.

Methylates, ethylates and butylates of the foregoing elements are also satisfactorily suitable.

Moreover, very good results were obtained with compounds comprising at least one rare earth alcoholate function and a polyalkenylene oxide group, in particular polyethylene oxide or polypropylene oxide.

The preference is for the alcoholates of polyalkylene glycol in which the number of alkylene oxide units is not greater than 20, preferably not greater than 10 and preferably not greater than 5.

The alcoholate groups may also be carried by molecules carrying a plurality of alcoholate functions on the same molecule. By way of example mention may be made of the compounds having two alcohol functions such as glycols, butane-diols, branched glycols such as propylene glycol, triols such as glycerol or trimethylolpropane.

The ligands comprising a rare earth alcoholate function may be identical or different.

It is also possible to use a mixture of alcoholates from two or more rare earths or a mixture of metal alcoholates of which at least one is a rare earth alcoholate. The ligands of those alcoholate mixtures may be identical or different.

The method according to the invention may be used for the cyclotrimerisation of any type of isocyanates or mixture of isocyanates as defined hereinbefore whether they are aliphatic, cycloaliphatic or aromatic, including the prepolymers having terminal isocyanate groups, in particular those described in U.S. Pat. No. 5,115,071, the content of which is incorporated by reference into the present application. It can thus be used for the trimerisation of isocyanates in the presence of various diols, triols or other polyols whose molecular weights are in a wide range, including polyols and aminopolyols comprising polyether and polyester groups, which are used for the production of polyurethane and polyisocyanurate resins.

The diisocyanates are however preferred.

The present invention concerns the (cyclo)trimerisation of compounds carrying at least two isocyanate functions which are designated in the present description by monomer isocyanates.

This may involve isocyanate monomers with a hydrocarbon skeleton exclusively of a nature which is aliphatic, straight-chain, branched or cyclic, or aromatic isocyanates.

Hexamethylenediisocyanate (HDI) may be particularly mentioned as a straight-chain aliphatic monomer.

Mention may also be made of aliphatic monomers in which the hydrocarbon skeleton is branched but the isocyanate functions are carried by primary carbon atoms, for example 2-methyl pentane diisocyanate.

Mention may also be made of monomers in which at least one isocyanate function is in a cycloaliphatic, secondary, tertiary or neopentylic position.

Thus, among such products, those which give excellent results with the catalysts of the invention, unlike other catalysts with which they have only a poor transformation rate, are monomers in which the isocyanate function is carried by a carbon atom which is cycloaliphatic, secondary, tertiary or neopentylic, in particular cycloaliphatic isocyanates. Those monomers are such that at least two isocyanate functions are spaced from the closest ring by at most one carbon and are preferably connected directly to it. In addition those cycloaliphatic monomers advantageously have at least two isocyanate functions carried by secondary, tertiary or neopentylic carbon atoms.

Surprisingly, good results are obtained for isocyanates in which the conformational freedom of the carbon carrying the NCO function is low. The following monomers may be mentioned by way of example:

the compounds corresponding to hydrogenation of the aromatic nucleus or nuclei carrying isocyanate functions of monomers of aromatic isocyanates and in particular TDI (toluene diisocyanate) and diisocyanatobiphenyls, the compound known by the abbreviation $H_{12}MDI$ [4,4'-bis-(isocyanatocyclohexyl)methane], the various BIC [Bis(isocyanato-methylcyclohexane)] and the cyclohexyldiisocyanates which are optionally substituted;

and in particular norbornanediisocyanate, often referred to by its abbreviation NBDI;

isophoronediisocyanate, or IPDI, or more precisely 3-isocyanatomethyl-3,5,5-trimethylcyclohexylisocyanate.

The following may be mentioned as aromatic monomers:

2,4- or 2,6-toluene diisocyanate (TDI);

2,6-4,4'-diphenylmethane diisocyanate (MDI);

1,5-naphthalene diisocyanate (NDI);

tolidine diisocyanate (TODI);

p-phenylene diisocyanate (PPDI).

Mention may also be made of isocyanate compounds comprising more than two isocyanate functions, by way of example mention may be made of 4-isocyanatomethyl-octamethylene-diisocyanate which is also known by the abbreviation TTI or NTI, and the ester of lysine 2-isocyanatoethyl-diisocyanate, also known by the name LTI.

The initial monomers may also be products from the oligomerisation of isocyanates of lower molecular mass, such oligomerisation products bearing isocyanate functions. In that case it is not necessary to separate the non-transformed oligomer from the reaction product formed at the end of the trimerisation reaction.

It is also possible to use mixtures of such isocyanates in the cyclotrimerisation reaction in order to obtain mixed isocyanurate compounds or mixtures of isocyanurates.

In that particular case of mixtures of isocyanates, it is possible to use in part molecules which have only one single isocyanate function. In that latter case the amount of isocyanate functions afforded by that monomeric compound may not represent more than 50% by number of the total of isocyanate functions of the whole of the compounds with isocyanate functions. That monomeric compound with a single isocyanate function may optionally comprise functions which are useful for final application of the composition such as polysiloxane functions, polyether functions, perfluorinated functions, alkoxysilane functions.

The catalyst or the mixture of catalysts is added to the reaction medium with agitation, preferably in the absence of solvent or in a solvent, preferably inert, with respect to the isocyanates of the reaction medium. In the case where the solvent is reactive with respect to the isocyanates, the concentration of catalyst is adjusted in such a way that the amount of solvent is not prejudicial to obtaining the compound for the envisaged application.

The solvent is preferably selected in such a way that its boiling point is higher than the reaction temperature. Mention may be made of aliphatic hydrocarbons such as hexane or aromatic hydrocarbons such as toluene, or again alcohols, in particular ethanol, propanol or isopropanol.

It is however possible to operate under pressure with solvents or gases in the supercritical state. The preference however is to operate in a neutral atmosphere.

The molar ratio of the amount of catalyst/amount of isocyanate functions (NCO) is advantageously at least $5 \cdot 10^{-5}$ and at most $5 \cdot 10^{-2}$, preferably between $10^{-4}$ and $10^{-2}$. The amount adopted will depend on the structure of the initial isocyanate and more particularly the hindrance of the isocyanate functions. In general, the more the isocyanate function is hindered, the more the reactivity of the isocyanate decreases and consequently the greater the amount of catalyst used.

When the gases dissolved in the initial isocyanate monomers are eliminated the amount of catalyst can be reduced.

In addition when the gases dissolved in the initial isocyanate monomers are eliminated, the reactivity of the catalysts is improved.

The dissolved gases ($CO_2$, halogenated gases, $O_2$ ...) can be eliminated by any known means, in particular by bubbling an inert gas such as nitrogen or argon, or by putting the reaction medium under vacuum.

The reaction is allowed to take place for a period which varies between 30 minutes and 7 hours, preferably between 1 hour and 5 hours.

The polycondensation reaction is stopped at the desired rate of transformation of the isocyanate functions.

To stop the (cyclo)trimerisation reaction, it is possible to add to the reaction medium a compound which destroys the catalyst activity of the rare earth alcoholate functions or their derivative forms as are present in the reaction medium, for example the metallic forms which are complexed with a ligand present in the reaction medium. Advantageously a strong acid or a peroxide is added to the reaction medium.

The term "strong acid" in accordance with the present invention is used to denote an acid whose pKa is 7 at most. Mention may be made in particular of hydrochloric acid, sulphuric acid, paratoluene sulphonic acid or phosphoric acid and its alkyl mono- or diesters, in particular diisopropyl phosphoric acid, with the acids optionally being diluted.

The peroxides which can be employed involve any peroxide corresponding to the definition generally accepted for such compounds, namely an anhydride or oxide compound, containing more oxygen than the normal oxide.

Mention may be made of hydrogen peroxide, diethyl peroxide, dibutyl peroxide or benzoyl peroxide.

Mention may also be made of peracids, in particular peracetic acid or perbenzoic acid as well as percarbonates or again the compounds of the reaction of oxygenated water with an isocyanate.

The strong acid or the peroxide is added in an amount such that it permits the transformation of the metal compound into an unreactive compound, that is to say transformation of an alcoholate into an alcohol and salts of a strong acid.

In general the method will use a molar ratio of strong acid functions (peroxide)/strong base function or metal alcoholate function of between 0.5 and 30, between 0.8 and 10.

The addition of those compounds to the reaction medium also causes the coloring thereof to disappear, being due to the presence of a metal complex, without a harmful effect on the initial isocyanates or the polycondensation products obtained.

In an alternative procedure it is also possible to absorb the catalyst or its derivative forms on a mineral support, for example silica, alumina, or other mineral oxides.

In accordance with an embodiment of the invention the (cyclo)trimerisation reaction is conducted in the presence of a compound having a nitrogen heterocycle with five members having at least two nitrogen atoms.

It has surprisingly been observed that, in the presence of a nitrogenous cyclic compound having at least two nitrogen atoms, the catalysts of the invention made it possible to arrive at a reaction product comprising besides the cyclotrimers with an isocyanurate group, polyisocyanate mono-uretdione compounds which are also referred to as "true dimers" which are molecules resulting from the condensation of two molecules of monomer isocyanates.

In particular a cyclic nitrogenous compound as defined hereinbefore, when added to a rare earth alcoholate in a molar ratio of cyclic nitrogenous compound/rare earth alcoholate of between 0.1 and 10 and in particular between 0.2 and 5, makes it possible to obtain a reaction product comprising polyisocyanate mono-uretdiones and polyisocyanate mono-isocyanurates in a molar ratio of polyisocyanate mono-uretdiones/polyisocyanate mono-isocyanurates of great than 0.5, in particular greater than 0.6, preferably greater than 0.75, and indeed greater than 1.

The invention thus concerns a method for the preparation of a polyisocyanate composition comprising polyisocyanate trimers, in particular polyisocyanate mono-isocyanurates which are also referred to as true trimers and polyisocyanate dimers, in particular polyisocyanate mono-uretdiones also referred to as true dimers, in which the molar ratio of true polyisocyanate dimers/true polyisocyanate trimers is greater than 0.5, in particular greater than 0.6 and preferably greater than 0.75, which involves effecting polycondensation of isocyanate monomers in the presence of a rare earth alcoholate and a nitrogenous compound comprising a heterocycle with five members, having at least two nitrogen atoms, the molar ratio of cyclic nitrogenous compound/rare earth alcoholate being between 0.1 and 10 and advantageously between 0.2 and 5.

The invention also concerns the use of a compound having a nitrogenous heterocycle with 5 members having at least two nitrogen is atoms to promote the opening/closing reaction of uretidinedione rings formed in a method for catalytic (cyclo)trimerisation, of isocyanate compounds having at least two isocyanate functions, in which the (cyclo)trimerisation catalyst comprises a rare earth alcoholate.

In the present invention the term "mono-uretdiones" or "true dimers" is used to denote the compounds obtained by condensation of two molecules of initial isocyanate monomers comprising a single uretdione ring.

The term "mono-isocyanurates" or "true trimers" is used to denote the compounds obtained by condensation of three molecules of initial isocyanate monomers comprising a single uretdione ring.

The term "heavy compounds" is used to denote the compounds obtained by the condensation of more than three molecules of isocyanate monomers, in particular the "bis-trimers", the "bis-dimers", the tris-trimers and the "dimers-trimers".

The bis-trimers are polyisocyanate molecules comprising two isocyanurate rings in which the connection between the two isocyanurate rings is ensured by a monomer unit, namely that two isocyanate functions are engaged in each of the isocyanurate rings.

The bis-dimers are polyisocyanate molecules comprising two uretdione rings in which the connection between the two uretdione rings is ensured by a monomer unit, namely that two isocyanate functions are engaged in each of the uretdione rings.

The tris-trimers are higher homologues of the bis-trimers comprising three isocyanurate rings.

In the case where the monomers are diisocyanates, tris-trimers are obtained by polycondensation of seven monomer chains and comprise three isocyanurate rings, two consecutive isocyanurate rings being connected by a monomer unit.

The dimers-trimers are higher homologues of the foregoing compounds comprising an isocyanurate function and a mono-uretidione function.

The nitrogenous pentacyclic compound with five members is advantageously selected from imidazole, triazole, tetrazole and their derivatives comprising one or more substituents, in particular between 1 and 4 substituents according to the nature of the ring.

The substituents may be selected independently of each other from OH, SH, a $C_1$–$C_4$ alkyl group, a $C_1$–$C_4$ hydroxyalkyl group, a $C_1$–$C_4$ aminoalkyl group, a $C_1$–$C_4$ alkylamino group; dialkylamino (each alkyl group having between 1 and 4 carbon atoms), a $C_1$–$C_4$ alkylthio group, a $C_1$–$C_4$ halogenoalkyl group, a $C_3$–$C_8$ cycloalkyl group, a $C_5$–$C_{10}$ aryl group, a heterocycle group in which the heterocycle comprises between 2 and 10 carbon atoms and between 1 and 4 heteroatoms which are identical or different selected from O, S and N and the group $NR_4$, $R_4$ being in particular a $C_1$–$C_4$ alkyl group or a $C_3$–$C_8$ cycloalkyl group.

The preference is for the compounds having a non-substituted imidazole nucleus or having an imidazole nucleus carrying a N-alkyl, preferably N-methyl, substituent.

It is generally preferred to add to the reaction medium the catalyst and the nitrogenous cyclic compound simultaneously in a solution of solvent.

As solvents mention may be made of those referred to hereinbefore. It is generally preferred to add the rare earth alcoholate at the same time as the nitrogenous cyclic compound, in particular imidazole or N-methylimidazole in solution in an alcohol ether, for example methoxyethanol.

The reaction is stopped at the desired transformation rate.

The reaction duration is dependent on the structure of the isocyanate, on the dilution, proportion of catalyst, the procedure adopted (batch procedure, continuous procedure . . . ) and the rate of advancement of the desired reaction. That variable time is generally between a few minutes and a few hours, at a maximum 24 hours. The catalysts of the invention permit good control of the reaction and therefore good control of the reaction kinetics and the reaction times.

At the end of the reaction the product obtained comprises in majority terms the following compounds:

the trimer of the initial isocyanate, in particular the "true trimer", namely the product of cyclotrimerisation of three molecules of initial isocyanate, comprising an isocyanurate ring;

the dimer of the initial isocyanate, namely the product of cyclotrimerisation of two molecules of initial isocyanate, comprising a uretidinedione ring;

carbamates of the initial isocyanate with an alcohol present in the reaction medium or coming from decomposition of the alcoholate;

allophanates of the initial isocyanate with an alcohol present in the reaction medium or coming from decomposition of the alcoholate;

allophanates, in particular true allophanates, namely the theoretical reaction product of two moles of isocyanate on a mole of alcohol; more precisely the theoretical reaction product of the carbamate formed by the reaction of a mole of isocyanate on a mole of alcohol present in the reaction medium, with a second mole of the initial isocyanate;

bis-trimers, namely the product of tricondensation of two moles of true trimers as defined hereinafter;

heavier oligomeric compounds comprising alone or in mixture isocyanurate, carbamate, allophanate uretidine dione, oxadiazinetrione, imino-oxadiazine-dione functions, in particular heavy trimers, namely the products of condensation of more than two moles of trimers with each other or with another compound present in the reaction medium;

trimer allophanate, namely the product of condensation of a trimer with an isocyanurate function on an alcohol present in the reaction medium to form a carbamate, followed by reaction of the carbamate thus obtained on a supplementary mole of a compound with an isocyanate function; and unreacted initial monomers.

The procedure does not give a product of nylon type or derivative products resulting from cyclisation of the diisocyanate on itself with consumption of all the isocyanate functions present.

The presence of water in the medium can result in the formation of compounds having urea and/or biuret functions carried, if appropriate, by the structures described hereinbefore.

The advantages of the method essentially lie in mastering and controlling the reaction by way of the use of rare earth catalysts. The advantages of the method thus provide that it is possible to obtain substantial variability in respect of compositions which are desired by the operator to respond to needs for particular properties such as for example low viscosity, and improvement in mechanical properties. It is thus possible to obtain compositions containing a high proportion of true trimers of greater than 50% and compositions containing high proportions of uretdione and isocyanurate compounds when using, in addition to the alcoholate or the mixture of rare earth alcoholate, nitrogenous heterocyclic compounds and the unreacted monomers are eliminated, in particular for isocyanates in which the isocyanate function is carried by a hindered carbon, advantageously secondary, preferably tertiary, and more particularly neopentylic, in particular those of IPDI, with a high rate of transformation of the initial isocyanate, preferably greater than 30%.

The examples hereinafter are intended to illustrate the invention.

EXAMPLE 1

Trimerisation of IPDI in the Presence of Yttrium Triisopropylate

In a 250 mL three-necked reaction flask, in a flow of nitrogen, 100 g of IPDI is added, namely 0.45 mole (0.9 mole of NCO functions). The reaction medium is agitated at a temperature of 25° C.

The temperature of the reaction medium is raised to 115° C. in 40 minutes.

0.5 g of yttrium isopropylate (that is to say 0.008 mole) is added, namely 0.2 mole of metal yttrium for 100 moles of NCO functions. The temperature of the reaction medium is maintained at approximately 115° C. After 40 minutes of reaction the transformation rate of the isocyanate functions is 38% and the reaction medium exhibits slightly yellow coloring. The reaction medium is left cool to 40° C. and 1 mL of diisopropyl phosphate is added. A reduction in the yellow coloring is then observed.

Analysis of the reaction medium before distillation of the monomer IPDI presents the following molecular distribution obtained after separation by chromatography on a high-performance PL GEL 50A/5 microns column. The eluent is dichloromethane.

| Species | % by weight standardized at 100 |
|---|---|
| IPDI monomer | 69.2 |
| true IPDT (1 single isocyanurate ring) | 24 |
| Bis trimer (2 isocyanurate rings) | 5.5 |
| Heavy (more than 2 isocyanurate rings) | 1.3 |

The presence of isopropyl carbamate and allophanate and of IPDI is noted in the different oligomers.

The ratio of true trimers/total trimers is equal to 77%.

EXAMPLES 2 THROUGH 8

Trimerisation of IPDI

In the same manner as in Example 1, the trimerisation of IPDI is effected, with variations in the operating conditions: reaction temperature, reaction time, amount of catalyst, or formulation of the catalyst.

The operating conditions and results are set out in Table 1 below.

| Test No | Reaction temperature and time | Catalyst/IPDI in % by weight | Metal catalyst/NCO function in molar % | TT IPDI (I.R.) in % | TT NCO dosage in % | True trimer/sum of the trimers in % |
|---|---|---|---|---|---|---|
| 2 | 80° C./2 h 30 | 0.3 | 0.125 | 4.5 | 5.27 | 75 |
| 3 | 110–120° C. 5 h | 0.1 | 0.04 | 4.6 | 5.71 | 81 |
| 4 | 110–120° C. 1 h | 0.5 | 0.2 | 30.8 | 36 | 77 |
| 5 | 110–120° C. 2 h 30 | 1 | 0.4 | 72.2 | | 58.5% |
| 6 | 108–115° C. 2 h 30 | 0.5* | 0.2 | 28 | 33.22 | 68 |
| 7 | 110° C. 50 min | 0.5 | 0.2 | 27 | 34 | 66.5 |
| 8** | 110° C. | 0.5 | 0.2 | — | 21.4 | — |

*20.96% toluene solution of catalyst expressed as a percentage of the metal catalyst.
**the final medium contains polyisocyanates with urea and biuret functions, probably due to the presence of water in the catalyst.

EXAMPLE 9

Trimerisation of IPDI in the Presence of Ytterbium Isopropylate

In the same manner as in Example 1, this example involves the trimerisation of IPDI in the presence of 0.5% by weight of ytterbium isopropylate, namely a molar ratio of metal catalyst/NCO functions of $1.6 \cdot 10^{-3}$. The temperature of the reaction medium is 110° C. and the reaction time is 50 minutes.

The reaction is stopped by the addition of 0.5 g of butanone peroxide.

The rate of transformation of the IPDI (quantitative determination by reaction to dibutylamine) is 34.5%.

Analysis of the reaction medium prior to distillation of the monomer IPDI presents the following molecular distribution obtained after separation by chromatography on a high-performance PL GEL 50A/5 microns column. The eluent is dichloromethane.

| Species | % by weight standardized at 100 |
|---|---|
| IPDI monomer | 72.7 |
| True IPDT | 17 |
| Dimer of IPDI plus allophanate of IPDI and isopropyl | 1.1 |
| Bis trimer (2 isocyanurate rings) | 7.1 |
| Heavy (more than 2 isocyanurate rings) | 2 |

The ratio of true trimers/total trimers is equal to 66.5%.

EXAMPLE 10

Trimerisation of a Mixture of HDI and IPDI

In the same manner as in Example 1, this involves the trimerisation of a mixture of HDI/IPDI (50/50) in the presence of 0.5% by weight of samarium isopropylate, that is to say a molar ratio of metal catalyst/NCO functions of $1.5 \cdot 10^{-3}$. The temperature of the reaction medium is 110° C. is and the reaction time is 2 hours.

The reaction is stopped by the addition of paratoluene sulphonic acid (amount representing twice the molar amount of catalyst).

The rate of transformation of the isocyanate monomers (quantitative determination by reaction to dibutylamine) is 21.4%.

The reaction medium has polyisocyanurates of IPDI, HDI and mixed IPDI/HDI compounds as well as compounds involving allophanates of isopropyl and IPDI or HDI. Also observed is the presence of compounds with urea and biuret functions of HDI and IPDI due to the probable presence of water in the catalyst.

EXAMPLE 11

Study of Blocking of the Reaction by Various Compounds

This example involves effecting trimerisation of IPDI as described in Example 1 except that the reaction is stopped by adding various acid or oxygen-bearing, organic or mineral compounds. Stoppage of the reaction and coloring after the blocking reaction are monitored.

| Acid blocking agent/amount in molar equivalent per mole of catalyst used | Stoppage of the reaction | Discoloration |
|---|---|---|
| Dilute sulphuric acid/3 | Yes/$CO_2$ given off | YES |
| Diisopropyl phosphate/2 | Yes/appearance of a precipitate | YES |
| $H_3PO_4$ 85%/2 | Yes/appearance of a precipitate and $CO_2$ given off | YES |
| Oxygenated blocking agent/amount in molar equivalent per mole of catalyst used | Stoppage of the reaction | discoloration |
| Butanone peroxide/5 | Yes/appearance of a precipitate | instant discoloration |
| Dibenzoyl peroxide/3 | YES but slow blocking (5 hours) | slow discoloration (1 night) |

| Acid blocking agent/amount in molar equivalent per mole of catalyst used | Stoppage of the reaction | Discoloration |
|---|---|---|
| Mineral blocking agent/amount in molar equivalent per mole of catalyst used | Stoppage of the reaction | Discoloration |
| Silica/100 mg | Slow blocking (3 h) | slow discoloration |

EXAMPLE 12

Synthesis of a Polyisocyanate Formulation Composed of IPDT and at Least one Allophanate of IPDI and Isopropanol Taking a 250 mL three-necked reaction vessel, in a flow of nitrogen, 100 g of IPDI is added, namely 0.45 mol. The reaction medium is agitated at a temperature of 25° C.

The temperature of the reaction medium is raised to 100° C.

2.25 g of a 20.96% toluene solution of yttrium tris isopropylate (that is to say 0.5% by weight of catalyst with respect to the IPDI involved) is added.

A slight degree of exothermy is observed which causes the temperature to rise to 107° C. in 15 minutes.

The temperature of the reaction medium is raised to 120° C. and then maintained at that temperature for 2 hours.

The temperature is reduced to 95° C. and 2 g of isopropanol is added to the reaction medium.

After one hour the reaction is stopped by the addition of 1 g of paratoluene sulphonic acid.

The rate of transformation into IPDI is 28%.

Analysis of the reaction medium before distillation of the IPDI monomer presents the following composition:

| Species | % by weight standardized to 100 |
|---|---|
| IPDI monomer | 72 |
| true IPDT | 10.8 |
| Dimer of IPDI plus allophanate of IPDI and isopropyl | 11.6 |
| Bis trimer (2 isocyanurate rings) plus bis allophanate of IPDI and isopropyl | 5 |
| Ratio of true trimers/total of the species not including the IPDI monomer | 39.5% |

EXAMPLE 13

Polycondensation of IPDI in the Presence of Lanthanum tris (2-Methoxy-ethylene Gylcolate)

Using a 50 mL three-necked reaction vessel, the procedure involves the addition at ambient temperature in a nitrogen flow of 20 g of isophorone diisocyanate (IPDI), that is to say 0.09 mole, or 0.18 mole of NCO. Added to the reaction medium is 5% of a solution of lanthanum tris (2-methoxy-ethylene gylcolate) alcoholate, that is to say 1 g, the amount of catalyst is of the order of 100 mg, namely a ratio metal/NCO of $1.5 \cdot 10^{-3}$. The temperature of the reaction medium is raised to 60° C. and the reaction is left with agitation for 5 hours. The reaction is stopped by the addition of 200 mg of paratoluene sulphonic acid. The rate of transformation of the IPDI is 74.5%.

Analysis of the reaction medium before distillation of the IPDI monomer by chromatography gives the following composition:

| Product | % by weight |
|---|---|
| IPDI | 25.5 |
| Carbamate of IPDI and 2-methoxyethanol | 0.5 |
| Allophanate of IPDI and 2-methoxyethanol | 6.7 |
| Dimer of IPDI | 0 |
| True trimer of IPDI | 27 |
| Bis trimer of IPDI | 20.4 |
| Heavy including tris trimer | 19.9 |
| Ratio of true tri to sum of the trimers | 0.40 |

The presence of allophanate functions is noted under the masses of the bis trimers and the heavy substances.

EXAMPLE 14

Polycondensation of IPDI in the Presence of Yttrium tris (2-Methoxy-ethylene Gylcolate)

Using a 50 mL three-necked reaction vessel, the procedure involves the addition at ambient temperature in a nitrogen flow of 20 g of isophorone diisocyanate (IPDI), that is to say 0.09 mole, or 0.18 mole of NCO. Added to the reaction medium are 5% of a solution of lanthanum tris (2-methoxy-ethylene gylcolate) alcoholate, that is to say 1 g, the amount of catalyst is of the order of 160 mg. The temperature of the reaction medium is raised to 60° C. and the reaction is left with agitation for 5 hours. The reaction is stopped by the addition of 200 mg of paratoluene sulphonic acid. The rate of transformation of the IPDI is 38.5%.

Analysis of the reaction medium before distillation of the IPDI monomer by chromatography gives the following composition:

| Product | % by weight |
|---|---|
| IPDI | 61.5 |
| Carbamate of IPDI and 2-methoxyethanol | |
| Allophanate of IPDI and 2-methoxyethanol | 9.5 |
| Dimer of IPDI | 0 |
| True trimer of IPDI | 11.6 |
| Bis trimer of IPDI | 12 |
| Heavy including tris trimer | 5.4 |
| Ratio of true tri to sum of the trimers | 0.40 |

The presence of allophanate functions is noted under the masses of the bis trimers and the heavy substances.

EXAMPLE 15

Polycondensation of IPDI in the Presence of Neodymium tris (Isopropylate)

Using a 50 mL three-necked reaction vessel, the procedure involves the addition at ambient temperature in a nitrogen flow of 20 g of isophorone diisocyanate (IPDI), that is to say 0.09 mole, or 0.18 mole of NCO. Added to the reaction medium is 1% (that is to say 200 mg, that is to say $6.2 \cdot 10^{-4}$ mol) of neodymium tris (isopropylate) alcoholate, namely a ratio metal/NCO of $3.5 \cdot 10^{-3}$. The temperature of the reaction medium is raised to 60° C. and the reaction is left with agitation for 5 hours. The is reaction is stopped by the addition of 200 mg of paratoluene sulphonic acid. The rate of transformation of the IPDI is 83.5%.

Analysis of the reaction medium before distillation of the IPDI monomer by chromatography gives the following composition:

| Product | % by weight |
|---|---|
| IPDI | 16.5 |
| Carbamate of IPDI and 2-methoxyethanol | |
| Allophanate of IPDI and 2-methoxyethanol | 1.2 |
| Dimer of IPDI | 0 |
| True trimer of IPDI | 40.2 |
| Bis trimer of IPDI | 21.3 |
| Heavy including tris trimer | 12 |
| Ratio of true tri to sum of the trimers | 0.55 |

The presence of allophanate functions is noted under the masses of the bis trimers and the heavy substances.

EXAMPLE 16

Polycondensation of IPDI in the Presence of Lanthanum tris (2-Methoxy-ethylene Glycolate) and Imidazole Preparation of the Catalyst Solution:

A first phase involves preparing the catalytic solution: 1.87g of imidazole (0.0275 mol) is introduced into 100 mL of a 10% by weight solution of lanthanum tris (2-methoxy-ethylene glycolate) in 2-methoxyethanol (density 1.01). The molar ratio of imidazole/lanthanum tris 2-methoxy-ethylene glycolate is equal to 1.

Reaction

Taking a 50 mL three-necked reaction vessel, the procedure involves the addition at ambient temperature in a flow of nitrogen of 20 g of isophorone diisocyanate (IPDI), that is to say 0.09 mole, namely 0.18 mole of NCO. 1 g of catalytic solution (that is to say $2.75 \cdot 10^{-4}$ mole of imidazole and $2.75 \cdot 10^{-4}$ mole of lanthanum tris-2-methoxy-ethylene gylcolate) is added to the reaction medium. The amounts of lanthanum alcoholate and imidazole are respectively equal to 100 mg and 19 mg, namely a metal/NCO ratio of $1.5 \cdot 10^{-3}$. The temperature of the reaction medium is raised to 60° C. and the reaction left with agitation for 5 hours and is then blocked by the addition of paratoluene sulphonic acid (200 mg). The rate of transformation of the IPDI is 54.7%.

Analysis of the reaction medium before elimination of the IPDI monomer is presented in the Table below:

| Product | % by weight |
|---|---|
| IPDI | 55.3 |
| Carbamate of IPDI and 2-methoxyethanol | |
| Allophanate of IPDI and 2-methoxyethanol | 8.8 |
| Dimer of IPDI | 13.8 |
| True trimer of IPDI | 13.2 |
| Bis trimer of IPDI | 6.8 |
| Heavy including tris trimer | 2.1 |
| Ratio of true tri to sum of the trimers | 0.625 |
| Ratio of true tri to sum of the true trimer and dimer | 1 |
| Ratio of true dimer/true trimer | 1.04 |

The presence of dimer and allophanate functions is noted under the masses of the bis trimers and the heavy substances.

EXAMPLE 17

Polycondensation of IPDI in the Presence of Yttrium tris (2-Methoxy-ethylene Glycolate) and Imidazole The procedure is as in Example 16, with the lanthanum alcoholate being replaced by that of yttrium.

Taking a 50 mL three-necked reaction vessel, the procedure involves the addition at ambient temperature in a flow of nitrogen of 20 g of isophorone diisocyanate (IPDI), that is to say 0.09 mole, namely 0.18 mole of NCO. The catalytic solution is added to the reaction medium. The amounts of yttrium alcoholate and imidazole are respectively equal to 150 mg and 32 mg, namely a metal/NCO ratio of $2.6 \cdot 10^{-3}$. The temperature of the reaction medium is raised to 60° C. and the reaction left with agitation for 5 hours and is then blocked by the addition of paratoluene sulphonic acid (200 mg). The rate of transformation of the IPDI is 41%.

Analysis of the reaction medium before elimination of the IPDI monomer is presented in the Table below:

| Product | % by weight |
|---|---|
| IPDI | 59 |
| Carbamate of IPDI and 2-methoxyethanol | 1.6 |
| Allophanate of IPDI and 2-methoxyethanol | 9.6 |
| Dimer of IPDI | 15.2 |
| True trimer of IPDI | 8.4 |
| Bis trimer of IPDI | 3.8 |
| Heavy including tris trimer | 0.8 |
| Ratio of true tri to sum of the trimers | 0.65 |
| Ratio of true tri to sum of the true trimer and dimer | 0.3 |
| Ratio of true dimer/true trimer | 1.81 |

The presence of dimer and allophanate functions is noted under the masses of the bis trimers and the heavy substances.

EXAMPLE 18

Polycondensation of IPDI in the Presence of Yttrium tris (Isopropylate) and Imidazole Taking a 50 mL three-necked reaction vessel, the procedure involves the addition at ambient temperature in a flow of nitrogen of 20 g of isophorone diisocyanate (IPDI), that is to say 0.09 mole, namely 0.18 mole of NCO. 200 mg of yttrium isopropylate ($7.5 \cdot 10^{-4}$ mole) and 51 mg of imidazole are added, namely a metal/NCO ratio of $4 \cdot 10^{-3}$. The temperature of the reaction medium is raised to 60° C. and the reaction left with agitation for 5 hours and is then blocked by the addition of paratoluene sulphonic acid (150 mg). The NCO titre is 0.552 and the rate of transformation of the IPDI is 77.3%.

Analysis of the reaction medium before elimination of the IPDI monomer is presented in the Table below:

| Product | % by weight |
|---|---|
| IPDI | 23.6 |
| Carbamate of IPDI and isopropyl | |
| Allophanate of IPDI and isopropyl | 3.5 |
| Dimer of IPDI | 20.9 |
| True trimer of IPDI | 22 |
| Bis trimer and trimer dimer of IPDI and trimer allophanate | 10.3 |
| Heavy including tris trimer | 0.8 |
| Ratio of true tri to sum of the trimers | 0.66 |
| Ratio of true tri to sum of the true trimer and dimer | 0.41 |
| Ratio of true dimer/true trimer | 0.95 |

The presence of dimer and allophanate functions is noted under the masses of the bis trimers and the heavy substances.

EXAMPLE 19

Polycondensation of IPDI in the Presence of Neodymium tris(Isopropylate)

The procedure is as in Example 18 with the yttrium alcoholate being replaced by that of neodymium.

Taking a 50 mL three-necked reaction vessel, the procedure involves the addition at ambient temperature in a flow of nitrogen of 20 g of isophorone diisocyanate (IPDI), that is to say 0.09 mole, namely 0.18 mole of NCO. There is added to the reaction medium 1% by weight with respect to the IPDI of neodymium tris isopropylate, that is to say 200 mg (namely $6.2 \cdot 10^{-4}$, namely a metal/NCO ratio of $3.5 \cdot 10^{-3}$) and 42 mg of imidazole. The temperature of the reaction medium is raised to 60° C. and the reaction left with agitation for 5 hours. The reaction is then stopped by the addition of 200 mg of paratoluene sulphonic acid. Analysis of the reaction medium before elimination of the IPDI monomer is presented in the Table below:

| Product | % by weight |
| --- | --- |
| IPDI | 39.4 |
| Carbamate of IPDI and isopropyl | 0 |
| Allophanate of IPDI and isopropyl | 1.2 |
| Dimer of IPDI | 31.4 |
| Bis dimer of IPDI | 4.6 |
| True trimer of IPDI | 13 |
| Bis trimer of IPDI | 4.8 |
| Heavy including tris trimer | 4.2 |
| Ratio of true tri to sum of the trimers | 0.59 |
| Ratio of true tri to sum of the true trimer and dimer | 0.3 |
| Ratio of true dimer/true trimer | 2.4 |

The presence of allophanate functions is noted under the masses of the bis trimers and the heavy substances.

EXAMPLE 20

Polycondensation of IPDI in the Presence of Yttrium tris (Isopropylate) and Imidazole Taking a 50 mL three-necked reaction vessel, the procedure involves the addition at ambient temperature in a flow of nitrogen of 20 g of isophorone diisocyanate (IPDI), that is to say 0.09 mole, namely 0.18 mole of NCO. 200 mg of yttrium isopropylate ($7.5 \cdot 10^{-4}$ mole) and 51 mg of imidazole are added, namely a metal/NCO ratio of $4 \cdot 10^{-3}$. The temperature of the reaction medium is raised to 60° C. and the reaction left with agitation for 5 hours and is then blocked by the addition of paratoluene sulphonic acid (150 mg). The NCO titre is 0.552 and the rate of transformation of the IPDI is 77.3%.

Analysis of the reaction medium before elimination of the IPDI monomer is presented in the Table below:

| Product | % by weight |
| --- | --- |
| IPDI | 23.6 |
| Carbamate of IPDI and isopropyl | |
| Allophanate of IPDI and isopropyl | 3.5 |
| Dimer of IPDI | 20.9 |
| True trimer of IPDI | 22 |
| Bis trimer and trimer dimer of IPDI and trimer allophanate | 10.3 |
| Heavy including tris trimer | 0.8 |
| Ratio of true tri to sum of the trimers | 0.66 |
| Ratio of true tri to sum of the true trimer and dimer | 0.41 |
| Ratio of true dimer/true trimer | 0.95 |

The presence of dimer and allophanate functions is noted under the masses of the bis trimers and the heavy substances.

EXAMPLE 21

Polycondensation of IPDI in the Presence of Yttrium tris(Isopropylate) and N-Methyl Imidazole Taking a 50 mL three-necked reaction vessel, the procedure involves the addition at ambient temperature in a flow of nitrogen of 20 g of isophorone diisocyanate (IPDI), that is to say 0.09 mole, namely 0.18 mole of NCO. 200 mg of yttrium isopropylate ($7.5 \cdot 10^{-4}$ mole) and 51 mg of N-methylimidazole are added, namely a metal/NCO ratio of $4 \cdot 10^{-3}$. The temperature of the reaction medium is raised to 60° C. and the reaction left with agitation for 5 hours and is then blocked by the addition of paratoluene sulphonic acid (150 mg). The presence of dimer and trimer bands is noted.

Analysis of the reaction medium before elimination of the IPDI monomer is presented in the Table below:

| Product | % by weight |
| --- | --- |
| IPDI | 50 |
| Carbamate of IPDI and isopropyl | |
| Allophanate of IPDI and isopropyl | 3 |
| Dimer of IPDI | 5 |
| True trimer of IPDI | 23 |
| Bis trimer and trimer dimer of IPDI and trimer allophanate | 12 |
| Heavy including tris trimer | 7 |
| Ratio of true tri to sum of the trimers | 0.55 |
| Ratio of true tri to sum of the true trimer and dimer | 0.49 |
| Ratio of true dimer/true trimer | 0.2 |

The presence of dimer and allophanate functions is noted under the masses of the bis trimers and the heavy substances.

What is claimed is:

1. A method for the (cyclo)trimerisation of isocyanates having at least two isocyanate functions, comprising:
    a) reacting initial isocyanate monomers having at least two isocyanate functions, optionally in the presence of other monomers reactive with the isocyanate monomers having at least two isocyanate functions, at a temperature of at least 20° C., and lower than 200° C., in the presence of a compound comprising at least one rare earth alcoholate function,
    b) stopping the reaction by inactivating the catalyst or its derivative forms in the reaction medium at a transformation rate of at least 2.5% and at most 90% of the initial isocyanate functions; and optionally
    c) distilling the reaction medium to eliminate the unreacted monomers.

2. A method according to claim 1, wherein the initial isocyanate monomers are diisocyanates.

3. A method according to claim 1, wherein the initial isocyanate monomers are diisocyanates with a hydrocarbon skeleton exclusively of a nature which is aliphatic, straight-chain, branched or cyclic, or aromatic isocyanates.

4. A method according to claim 3, wherein the diisocyanates have at least one isocyanate function in a cycloaliphatic, secondary, tertiary or neopentylic position.

5. A method according to claim 3, wherein at least two isocyanate functions are spaced from the ring which is closest by at most one carbon.

6. A method according to claim 3, wherein the isocyanate functions are carried by secondary, tertiary or neopentylic carbon atoms.

7. A method according to claim 6, wherein the isocyanates are selected from $H_{12}$MDI, BIC, NBDI and IPDI.

8. A method according to claim 1, wherein the compound comprising a rare earth alcoholate function is a rare earth alcoholate.

9. A method according to claim 8, wherein the rare earth alcoholate is selected from the group consisting of alcoholates of the following elements:

scandium, yttrium, lanthanum, cerium, praseodymium, neodymium, samarium, europium, gadolinium, terbium, ytterbium and lutetium.

10. A method according to claim 8, wherein the rare earth alcoholate is selected from methylate, ethylate, propylate, isopropylate and butylate of rare earths.

11. A method according to claim 1, wherein the compound comprising a rare earth alcoholate function also comprises a polyalkenylene oxide group.

12. A method according to claim 1, wherein the catalyst is added in a molar ratio of rare earth alcoholate/NCO functions of between $5 \cdot 10^{-5}$ and $5 \cdot 10^{-2}$.

13. A method according to claim 1, wherein the reaction is stopped by the addition of a strong acid or a peroxide.

14. A method according to claim 13, wherein the strong acid or the peroxide are added in a molar ratio of strong acid (peroxide) functions/strong base functions with a metal alcoholate of between 0.5 and 30.

15. A method according to claim 1, wherein the condensation reaction is stopped at a transformation rate of at least 10% and at most 80%.

16. A method according to claim 1, wherein in step a) a nitrogenous compound is added comprising a heterocycle with five members, having at least two nitrogen atoms.

17. A method according to claim 16, wherein the molar ratio of cyclic nitrogenous compound/compound comprising at least one rare earth alcoholate function is between 0.1 and 10.

18. A method according to claim 16, wherein the nitrogenous pentacyclic compound comprising at least two nitrogen atoms is selected from the group consisting of imidazole, triazole, tetrazole and their derivatives comprising one or more substituents.

19. A method according to claim 16, wherein the nitrogenous heterocyclic compound with five members is imidazole or one of its derivatives comprising one or more substituents.

* * * * *